(12) United States Patent
Lyalin (10) Patent No.: US 8,706,795 B2
(45) Date of Patent: Apr. 22, 2014

(54) SIMD INTEGER ADDITION INCLUDING MATHEMATICAL OPERATION ON MASKS

(75) Inventor: Sergey Lyalin, Nizhni Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/391,263

(22) PCT Filed: Mar. 30, 2011

(86) PCT No.: PCT/RU2011/000203
§ 371 (c)(1),
(2), (4) Date: Dec. 13, 2012

(87) PCT Pub. No.: WO2012/134321
PCT Pub. Date: Oct. 4, 2012

(65) Prior Publication Data
US 2014/0025717 A1    Jan. 23, 2014

(51) Int. Cl.
*G06F 7/50* (2006.01)
(52) U.S. Cl.
USPC .......................................................... 708/700
(58) Field of Classification Search
None
See application file for complete search history.

(56) References Cited

U.S. PATENT DOCUMENTS

| | | | |
|---|---|---|---|
| 6,999,985 B2* | 2/2006 | Symes et al. | 708/524 |
| 2006/0288069 A1 | 12/2006 | Simkins et al. | |
| 2008/0281897 A1* | 11/2008 | Messinger | 708/708 |
| 2013/0275728 A1* | 10/2013 | Toll et al. | 712/221 |

OTHER PUBLICATIONS

International Preliminary Report on Patentability mailed Oct. 10, 2013 for International Application No. PCT/RU2011/000203, 7 pages.
Darek Mihocka et al., "A Proposal for Hardware-Assisted Arithmetic Overflow Detection for Array and Bitfield Operations," WISH—Workshop on Infrastructures for Software/Hardware Co-Design, Apr. 25, 2010, XP55014476, Abstract, Sections 1.1, 2.0, 2.3.
Shenghui Su et al., "Operation of Super Long Integers in Cryptographic Applications," Parallel and Distributed Computing, Applications and Technologies, 2008, PDCAT 2008. Ninth International Conference on, IEEE, Piscataway, NJ, USA, Dec. 1, 2008, pp. 363-369, XP031373727, ISBN: 978-0-7695-3443-5, Section 2.6.
International Search Report mailed Dec. 23, 2011 from International Application No. PCT/RU2011/000203.

* cited by examiner

*Primary Examiner* — David H Malzahn
(74) *Attorney, Agent, or Firm* — Schwabe, Williamson & Wyatt, P.C.

(57) ABSTRACT

Methods, apparatuses, and articles associated with SIMD adding two integers are disclosed. In embodiments, a method may include element-wise SIMD adding corresponding elements of a first SIMD-sized integer (A) and a second SIMD-sized integer (B) to generate a SIMD-sized integer result (R) and a carry bit. A may have an integer size (SizeA), while B may have an integer size (SizeB). The addition, in response to SizeA greater than SizeB, may further include updating R and the carry bit in view of one or more elements of A that do not have corresponding element or elements of B. Further, element-wise SIMD adding may include performing one or more mathematical operations on first one or more masks, with the first one or more masks interpreted as integers, and interpreting one or more integer results of the one or more mathematical operations as second one or more masks.

17 Claims, 6 Drawing Sheets

SIMD INTEGER ADDITION INCLUDING MATHEMATICAL OPERATION ON MASKS

This application is a national stage application of PCT application PCT/RU2011/000203, filed Mar. 30, 2011, entitled "SIMD INTEGER ADDITION INCLUDING MATHEMATICAL OPERATION ON MASKS," and claims priority to the PCT application.

TECHNICAL FIELD

Embodiments of the present disclosure relate to the field of data processing, in particular, to methods, apparatuses and articles associated with single instruction multiple data (SIMD) integer addition.

BACKGROUND

Unless otherwise indicated herein, the materials described in this section are not prior art to the claims in this application and are not admitted to be prior art by inclusion in this section.

With advances in electronics, integrated circuit, computing and networking technologies, applications, such as, but not limited to, multimedia applications or scientific computing, have become more computational intensive. SIMD computing generally offers improved execution performance over scalar computing. However, efficient carry propagation for addition of two arbitrary long integer numbers remains a challenge.

BRIEF DESCRIPTION OF THE DRAWING

Embodiments of the present disclosure will be presented by way of example embodiments, but not limitations, illustrated in the accompanying drawings in which like references denote similar elements, and in which.

DETAILED DESCRIPTION

Methods and apparatuses for SIMD adding of two integers are disclosed. In various embodiments, a method may include element-wise SIMD adding, on a SIMD computing device, corresponding elements of a first SIMD-sized integer (A) and a second SIMD-sized integer (B) to generate a SIMD-sized integer result (R) and a carry bit. A may have an integer size (SizeA), while B may have an integer size (SizeB). The addition may further include, fur cases where SizeA is greater than SizeB, updating R and the carry bit in view of one or more elements of A that do not have corresponding element or elements of B. Further, element-wise SIMD adding may include performing one or more mathematical operations on first one or more masks, with the first one or more masks interpreted as integers, and interpreting one or more integer results of the one or more mathematical operations as second one or more masks.

In various embodiments, the method may further include moving the first one or more masks from first one or more mask registers of the SIMD computing device respectively to one or more general purpose registers of the SIMD computing device, prior to performing the one or more mathematical operations on the first one or more masks; and moving the second one or more masks from the one or more general purpose registers respectively to second one or more mask registers of the SIMD computing device, after performing the one or more mathematical operations on the first one or more masks in the one, or more general purpose registers.

In various embodiments, element-wise SIMD adding may further include performing element-wise unsigned integer less compare of R to A to generate a carry mask that indicates whether overflow occurred in each SIMD element during the element-wise SIMD adding, and/or performing element-wise unsigned integer equality compare of R to an all 1 binary constant to generate a saturation mask that indicates which element or elements of a R has all 1 bits. For these embodiments, performing one or more mathematical operations on first one or more masks may include performing one or more mathematical operations on the carry mask and the saturation mask.

In various embodiments, performing one or more mathematical operations on a carry mask and a saturation mask may include shifting left the carry mask by 1 bit to generate a first instance of a correction mask, performing a bitwise Boolean OR operation on the first instance of the correction mask with a carry in to generate a second instance of the correction mask, integer adding the saturation mask to the second instance of the correction mask to generate a third instance of the correction mask, and/or performing a bitwise Boolean XOR operation on the third instance of the correction mask with the saturation mask to generate a fourth instance of the correction mask.

In various embodiments, the second one or more masks may include a correction mask, and element-wise SIMD adding may include element-wise integer subtracting an all 1 binary constant from an initial result of the element-wise SIMD adding, masked by the correction mask, to generate R, and/or right shifting the correction mask by an effective mark width in bits, to generate the carry bit.

In various embodiments, updating R and the carry bit may include updating R and the carry bit in view of one or more elements of A that do not have corresponding element or elements of B, while the carry bit does not equal 0, and at least one element of A has not been considered, and updating R in view of one or more elements of A that do not have corresponding element or elements of B, after the carry bit has been determined to equal 0, and at least one element of A has not been considered.

In various embodiments, updating R and the carry bit in view of one or more elements of A that do not have corresponding element or elements of B, while the carry bit does not equal 0, and at least one element of A has not been considered may include for an element of A that does not have corresponding element of B while the carry bit does not equal 0, generating a saturation mask by performing element-wise compare less between a current result of the element-wise SIMD adding and an all 1 binary constant, integer adding the saturation mask to a carry in (from a prior iteration) to generate a first instance of a correction mask, and/or performing a bitwise Boolean XOR operation on the first instance of the correction mask with the saturation mask to generate a second instance of the correction mask. Further, the operation may include for an element of A that does not have corresponding element of B while the carry bit does not equal 0, right shifting the correction mask by an effective mark width in bits to update the carry bit.

In various embodiments, apparatuses may be endowed with hardware and/or software configured to practice one or more aspects of the above described embodiments of the method of the present disclosure. In various embodiments, an article of manufacture with tangible, non-transitory computer-readable storage medium may be provided with programming instructions configured to cause an apparatus; in response to execution of the programming instructions by the apparatus, to practice one or more aspects of the above described embodiments of the method of the present disclosure.

Various aspects of the illustrative embodiments will now be further described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. A feature described in a parenthetical format denotes the feature as an optional feature, e.g., "an instance of (partitions of) an application service," denotes the application service may or may not be "partitioned."

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
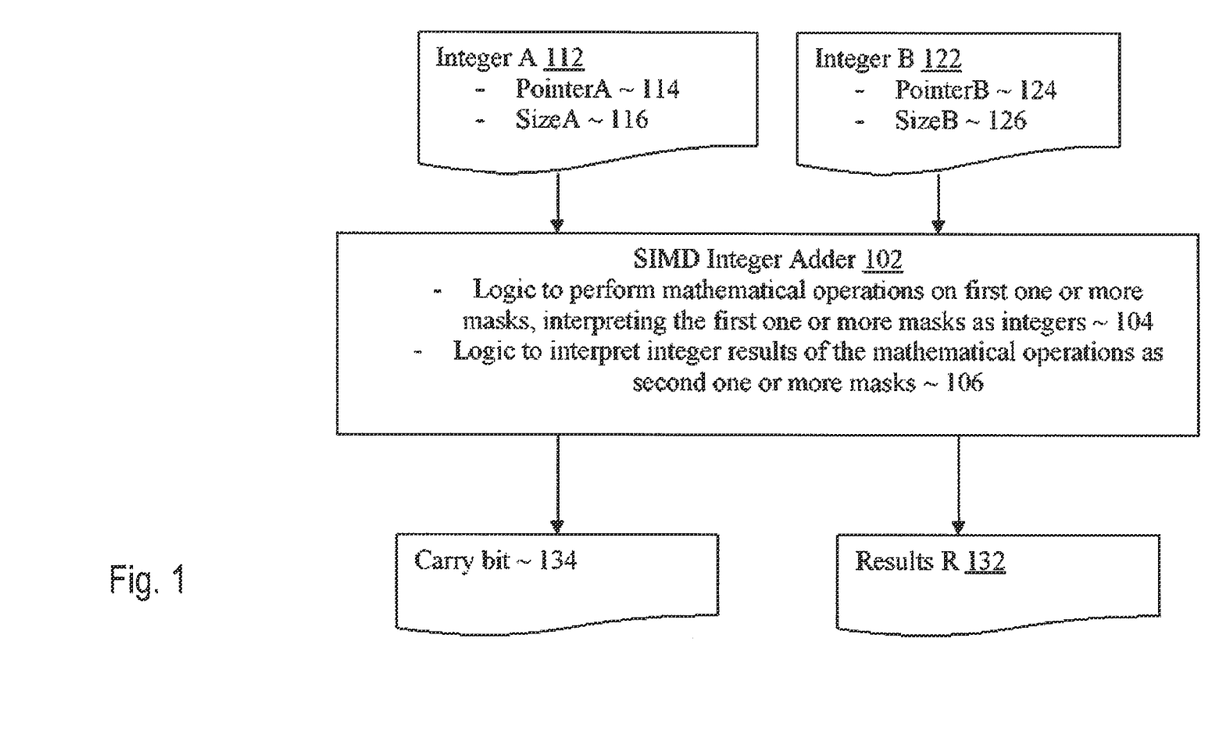
FIG. 1 illustrates an overview of SIMD integer addition, in accordance with various embodiments of the present disclosure.

FIG. 1 illustrates an overview of SIMD integer addition, in accordance with various embodiments of the present disclosure. As illustrated, SIMD integer adder 102 may be configured to SIMD add integer A 112 and integer B 122 on a SIMD computing device with SIMD units (not shown) to generate result R 132, and in some cases, carry bit 134. In particular, SIMD integer adder 102 may be configured with logic to perform, as part of the SIMD addition, one or more mathematical operations on first one or more masks, interpreting these masks as integers, 104, and subsequently interpret one or more of the integer results of the mathematical operations as second one or more masks, 106, to be described more fully below. Integers A and B may be respectively SIMD sized with sizes SizeA and SizeB, 116 and 126, of arbitrary lengths. SizeA and SizeB may be expressed in terms of number of SIMD register units. Integers A and B may further have associated pointers PointerA and PointerB, 114 and 124, respectively pointing to starting storage locations of integers A and B, e.g., system memory of the SIMD computing device. A SIMD unit may also be referred to as a SIMD register.

Figure 2:
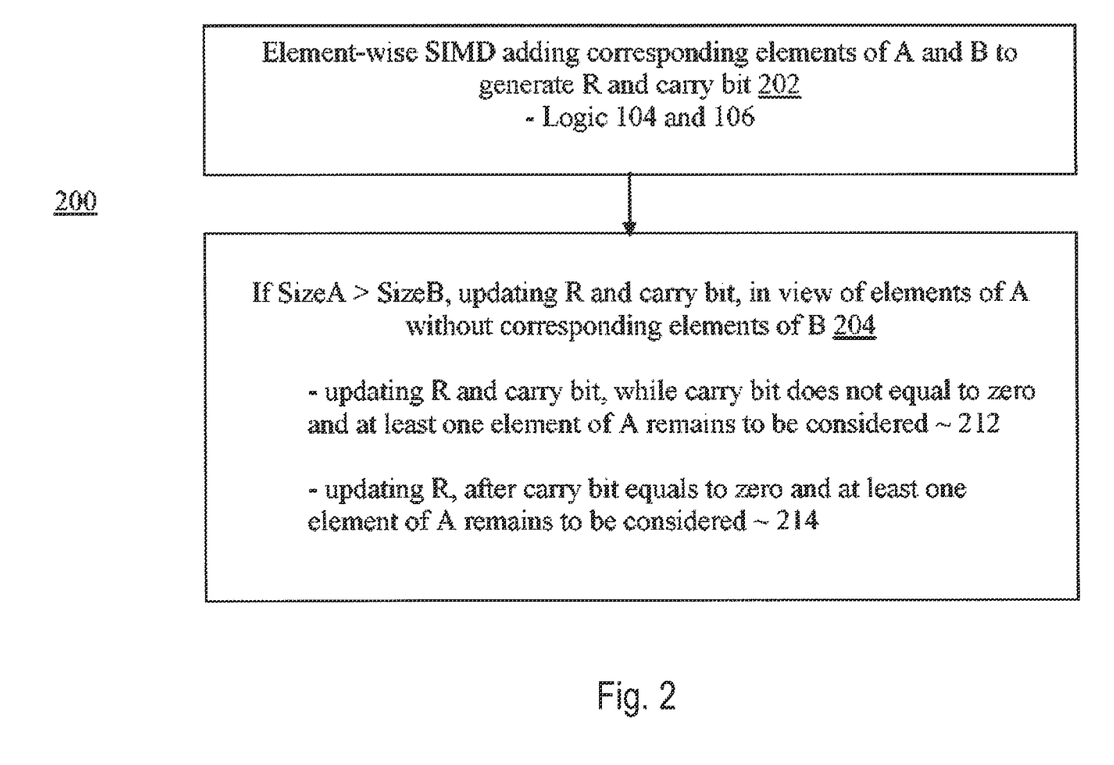
FIG. 2 illustrates in further details, operations of SIMD integer addition, in accordance with various embodiments of the present disclosure.

Referring now to FIG. 2, which illustrates in further details, the operations of SIMD integer addition, in accordance with embodiments of the present disclosure. As illustrated, for various embodiments, the operations of SIMD integer addition 200 may include element-wise SIMD adding, 202, corresponding elements of A 112 and B 122 to generate R 132 and if applicable, carry bit 134. In cases where SizeA is greater than SizeB, operations 200 may further include updating R 132, 204, and if applicable, carry bit 134, in view of one or more elements of A 112 that do not have corresponding element or elements of B 122.

In various embodiments, element-wise SIMD adding, 204, include the earlier described operations of performing one or more mathematical operations on first one or more masks, interpreting these masks as integers, 104, and subsequently interpret one or more of the integer results of the mathematical operations as second one or more masks, 106. Updating R and the carry bit, 204, on the other hand, may include updating R and the carry bit in view of one or more elements of A that do not have corresponding element or elements of B, while the carry bit does not equal 0, and at least one element of A has not been considered, 212, and updating R in view of one or more elements of A that do not have corresponding element or elements of B, after the carry bit has been determined to equal 0, and at least one element of A has not been considered, 214. These features of performing mathematical operations on first one or more masks, interpreting them as integers, and subsequently interpreting one or more of the integer results of the mathematical operations as second one or more masks, and updating R and the carry bit, may enable the improvement in performance for carry propagation to scale linearly along with the width of the SIMD unit or register of the SIMD computing device, while such linear scaling of performance is generally not available among the prior art approaches. The reason scaling of performance is generally not available among the prior art approaches, is at least in part because most known prior art approaches have to process carries from every SIMD element individually.

Figure 3:
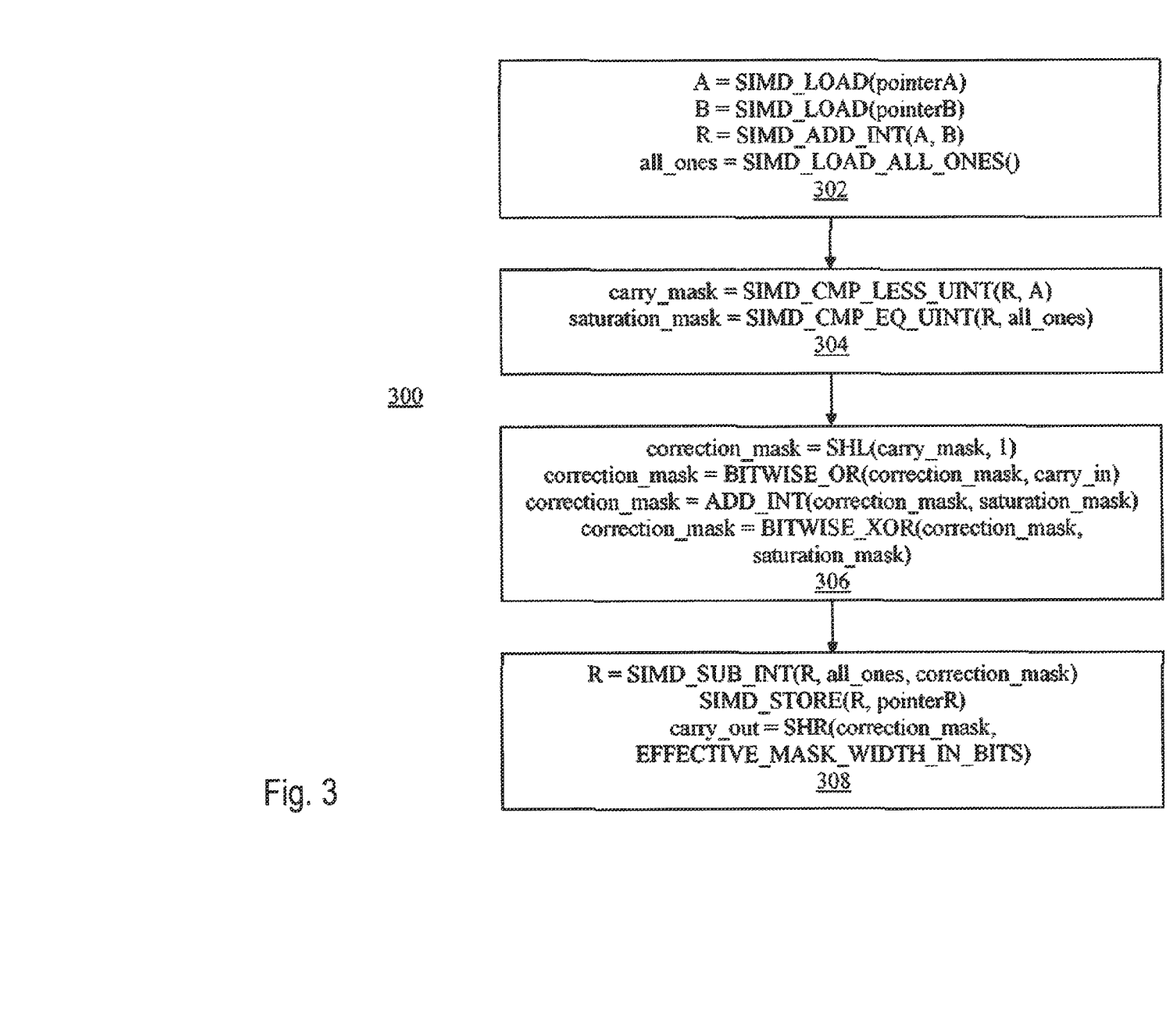
FIG. 3 illustrates the element-wise SIMD adding operation of FIG. 2 in further details, in accordance with various embodiments of the present disclosure.

Referring now to FIG. 3, wherein the element-wise SIMD adding operation is illustrated in further details, in accordance with various embodiments. As illustrated, element-wise SIMD adding operation 300 may include a first group of operations, 302, that includes loading integers A and B, 112 and 122 into memory (A SIMD_LOAD(pointerA), B=SIMD_LOAD(pointerB)), and element-wise SIMD adding integers A and B, 112 and 122 to generate result R (R=SIMD_ADD_INT(A, B)). In various embodiments, element-wise SIMD adding integers A and B, 112 and 122, may be performed with wrapping. In various embodiments, first group of operations 302 may further include initializing a SIMD register of the SIMD computing device with an all 1 binary constant (all_ones=SIMD_LOAD_ALL_ONES( )).

In various embodiments, element-wise SIMD adding operation 300 may further include a second group of operations, 304, including generating a carry mask and a saturation mask. The early mask may indicate whether overflow occurred in each SIMD element during the element-wise SIMD adding, whereas the saturation mask may indicate which element or elements of a R has all 1 bits. The carry mask may be generated by performing element-wise SIMD unsigned integer less compare of R to A (carry_ mask=SIMD_CMP_LESS_UINT(R, A)), whereas the saturation mask may be generated by element-wise SIMD unsigned integer equality compare of R to an all 1 binary constant (saturation_mask=SIMD_CMP_EQ_UINT(R, all_ones)).

Continuing to refer to FIG. 3, in various embodiments, element-wise SIMD adding operation 300 may further include a third group of operations 306 that perform a number of mathematical operations on the carry mask and the saturation mask to generate a correction mask. In particular, operations 306 may include shifting left the carry mask by 1 bit to generate a first instance of a correction mask (correction_mask=SHL (carry_mask, 1)), performing a bitwise Boolean OR operation on the first instance of the correction mask with a carry in (from a prior iteration) to generate a second instance of the correction mask (correction_mask=BITWISE_OR(correction_mask, carry_in)) integer adding the saturation mask to the second instance of the correction mask to generate a third instance of the correction mask (correction_mask=ADD_INT(correction_mask, saturation_mask)), and/or performing a bitwise Boolean XOR operation on the third instance of the correction mask with the saturation mask to generate a fourth instance of the correction mask (correction_mask=BITWISE_XOR(correction$_{13}$ mask, saturation_mask)).

In various embodiments where the SIMD computing device does not include support to allow mathematical operations to be directly performed on masks in mask registers, the carry mask and the saturation mask may be moved from the mask registers to respective general purpose registers, prior to performing the mathematical operations on the carry and saturation masks. The integer results of the mathematical operations may be subsequently moved back from the general purpose registers to the same or different mask registers, after performance of the mathematical operations.

Still referring to FIG. 3, in various embodiments, element-wise SIMD adding operation 300 may further include a fourth group of operations 308. Operations 308 may include element-wise SIMD integer subtracting of an all 1 binary constant from an initial result of the element-wise SIMD adding, masked by the correction mask, to generate R 132 (R=SIMD_SUB_INT(R, all_ones, correction_mask) storing R (SIMD_STORE(R, pointer), and/or right shifting the correction mask by an effective mask width in bits, to generate the carry bit (carry_out=SHR(correction_mask, EFFECTIYE_MASK_WIDTH_IN_BITS).

It should be noted that the carry mask, the saturation mask, the correction mask, the effective mask width mentioned above in the description of the element-wise SIMD adding operation 300 are local to the element-wise SIMD adding operation 300. These masks and mask width are different from other local masks and/or width of the same names mentioned in later discussions of other operations.

Referring back to FIG. 2, for cases where Size A is greater than SizeB, SEMI) integer addition may further include updating R 132 and carry bit 134, in view of elements of A without corresponding elements of B, 204. Further, in various embodiments, update operation 204 may include updating R 132 and carry bit 134, while carry bit 134 does not equal to zero and at least one element of A 112 remains to be considered, 212, and updating R 132, after carry bit 134 equals to zero and at least one element of A 112 remains to be considered, 214.

In various embodiments, operation 212 may be implemented logically as follows:

i=sizeB
while (carry !=0) AND (i<sizeA) do
carry=SIMD_BLOCK_ADD_CARRY(pointerA+i, pointerR+i, carry)+
i=i+1
end where i is an index, and pointerR points to the starting storage location of the result R.

The function SIMD_BLOCK_ADD_CARRY will be further described below with references to FIG. 4.

In various embodiments, operation 214 may be implemented logically as follows:
while i<sizeA do
tmp=SIMD_LOAD(pointerA+i)
SIMD_STORE(tmp, pointerR+i)
i=i+1
end where tmp is a temporary variable, SIMD_LOAD and SIMD_STORE are SIMD Load and Store instructions.

Figure 4:
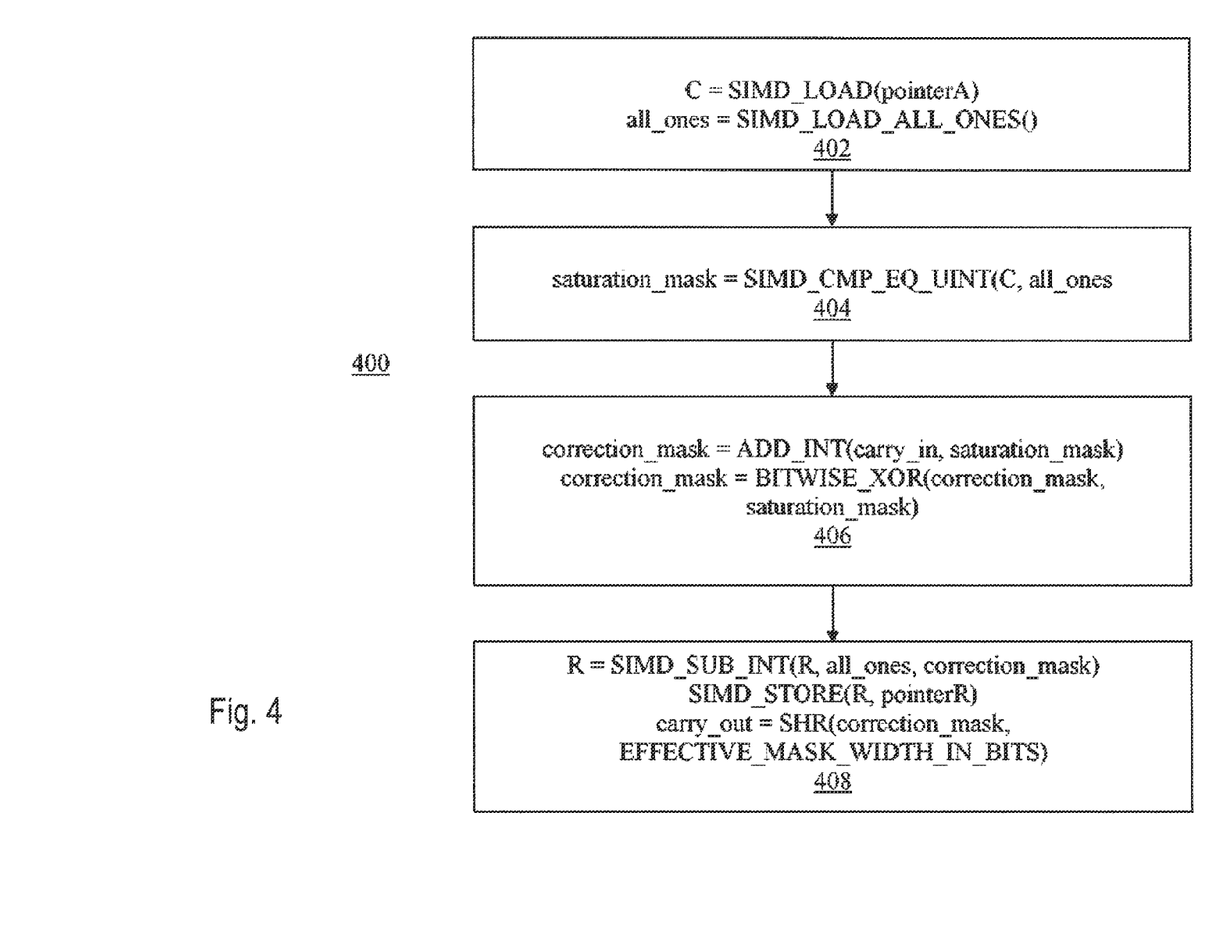
FIG. 4 illustrates an aspect of the updating operation of FIG. 2 in further details, in accordance with various embodiments of the present disclosure.

Referring now to FIG. 4, wherein the operations of the function SIMD_BLOCK_ADD_CARRY are illustrated in further details, in accordance with embodiments of the present disclosure. As illustrated, SIMD_BLOCK_ADD_CARRY operations 400 may include a first group of operations 402. Operations 402 may include SIMD loading of integer A into memory (C=SIMD_LOAD(pointerA)), and initializing a SIMD register with an all 1 binary constant (all_ones=SIMD_LOAD_ALL_ONES( )).

Additionally, operations 400 may further include a second single operation group 404 to generate a saturation mask (saturation_mask=SIMD_CMP_EQ_UINT(R, all_ones)). Operations 400 may further include a third group of operations 406 to perform a number of mathematical operations on the saturation mask. Operations 406 may include integer adding of the saturation mask to a carry in (from a prior iteration) to generate a first instance of a correction mask (correction_mask=ADD_INT(carry_in, saturation_mask)), and/or performing a bitwise Boolean XOR operation on the first instance of the correction mask with the saturation mask to generate a second instance of the correction mask (correction_mask=BITWISE_XOR(correction_mask, saturation_mask)).

Still referring to FIG. 4, operations 400 may further include a fourth group of operations 408 to save the updated result R 132 and if applicable, carry bit 132. Operations 408 may include element-wise SEMI) integer subtracting an all 1 binary constant form a current value of result R 132, masked by the correction mask (R=SIMD_SUB_INT(R, all_ones, correction_mask)), storing R (SIMD_STORE(R, pointerR)), and/or right shifting the correction mask by an effective mark width in bits, to generate the carry bit (carry_out=SHR(correction_mask, EFFECTIVE_MASK_WIDTH_IN_BITS).

As mentioned before, the saturation mask, the correction mask, the effective mask width mentioned above in the description of operations 400 of the function SIMD_BLOCK_ADD_CARRY are local to operations 400. These masks and mask width are different from other local masks and/or width of the same names mentioned in other discussions of other operations.

Figure 5:
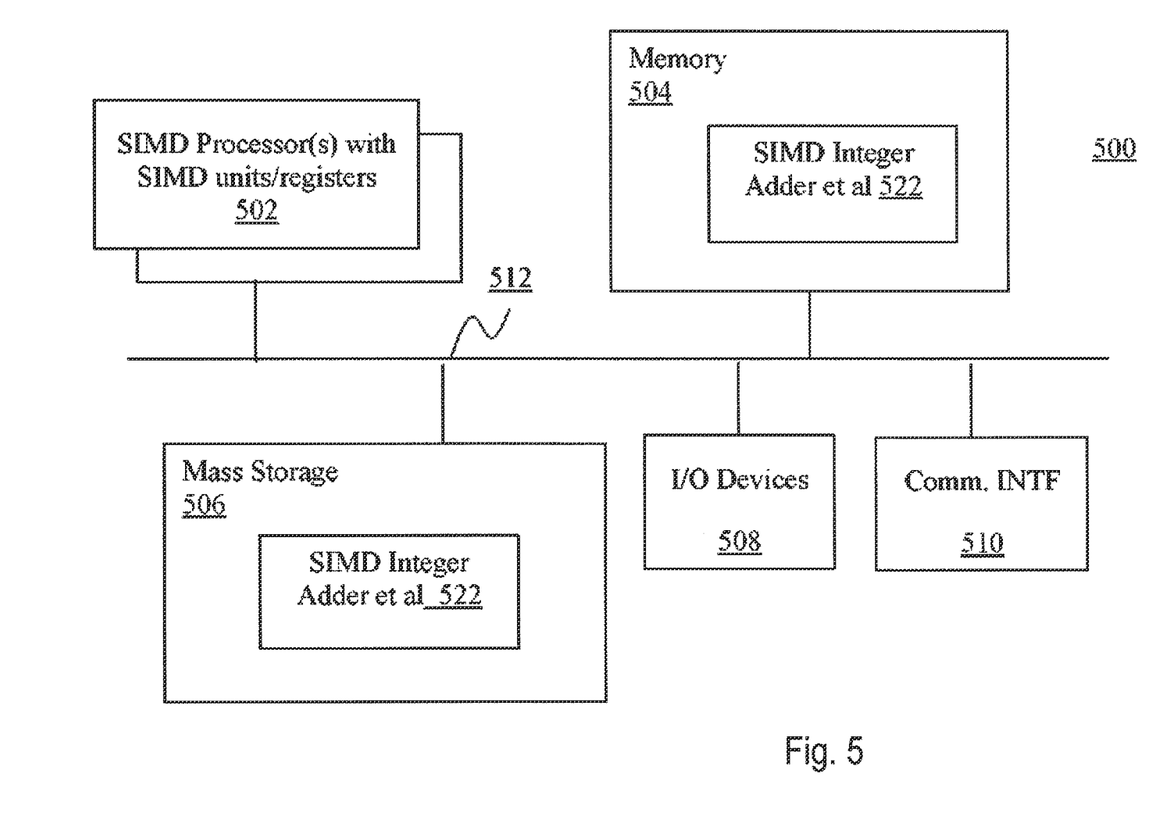
FIG. 5 illustrates an example computer system suitable for use to practice SIMD integer addition, in accordance with embodiments of the present disclosure.

FIG. 5 illustrates an example computer system suitable for use to practice the SIMD integer addition, in accordance with various embodiments of the present disclosure. As shown, computing system 500 may include a number of SIMD processors or processor cores 502 with SIMD units or registers, and system memory 504. For the purpose of this application, including the claims, the terms "processor" and "processor cores" may be considered synonymous, unless the context clearly requires otherwise. Additionally, computing system 500 may include mass storage devices 506 (such as diskette, hard drive, compact disc read only memory (CDROM) and so forth), input/output devices 508 (such as display, keyboard, cursor control and so forth) and communication interfaces 510 (such as network interface cards, modems and so forth). The elements may be coupled to each other via system bus 512, which represents one or more buses. In the case of multiple buses, they may be bridged by one or more bus bridges (not shown).

Each of these elements performs its conventional functions known in the art. In particular, system memory 504 and mass storage 506 may be employed to store a working copy and a permanent copy of the programming instructions implementing the SIMD integer adder 102 and other related routines, herein collectively denoted as 522. The various components may be implemented by assembler instructions supported by SIMD processor(s) 502 or high-level languages, such as, for example, C, that can be compiled into such instructions.

The permanent copy of the programming instructions may be placed into permanent storage 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The constitution of these elements 502-512 are known, and accordingly will not be further described.

Figure 6:
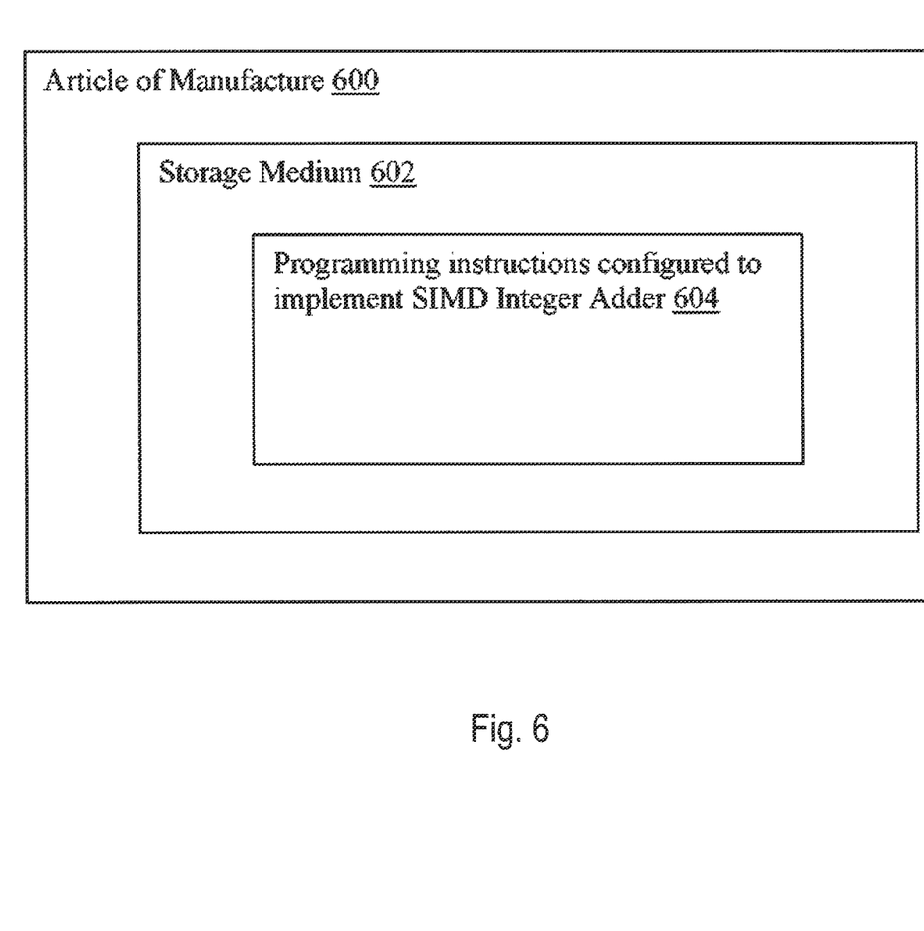
FIG. 6 illustrates an article of manufacture having programming instructions configured to cause an apparatus to practice SIMD integer addition, in accordance with embodiments of the present disclosure.

FIG. 6 illustrates an article of manufacture with programming instructions configured to enable an apparatus to practice SIMD integer addition, in accordance with embodiments of the present disclosure. As shown, article of manufacture 600 may include computer-readable non-transitory storage medium 602. Storage medium 602 may include programming instructions 604 configured to implement SIMD integer adder 102 of FIG. 1.

Storage medium 602 represents a broad range of persistent storage medium known in the art, including but are not limited to flash memory, optical or magnetic disks. Programming instructions 604, in particular, may enable a SIMD apparatus, in response to their execution by the SIMD apparatus to perform operations including:

element-wise SIMD adding corresponding elements of a first SIMD-sized integer (A) and a second SIMD-sized integer (B) to generate a SIMD-sized integer result (R) and a carry bit, wherein A has an integer size (SizeA), and B has an integer size (SizeB); and in response to SizeA greater than SizeB, updating R and the carry bit in view of one or more elements of A that do not have corresponding element or elements of B;

wherein element-wise SIMD adding includes performing one or more mathematical operations on a carry mask and a saturation mask, comprising shifting left the carry mask by 1 bit to generate a first instance of a correction mask;

performing a bitwise Boolean OR operation on the first instance of the correction mask with a carry in to generate a second instance of the correction mask;

integer adding the saturation mask to the second instance of the correction mask to generate a third instance of the correction mask; and performing a bitwise Boolean XOR operation on the third instance of the correction mask with the saturation mask to generate a fourth instance of the correction mask; and wherein the carry mask indicates whether overflow occurred in each SIMD element during the element-wise SIMD adding, and wherein the saturation mask indicates which element or elements of R has all 1 bits.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof

What is claimed is:

1. A method, comprising:

element-wise SIMD adding, by a SIMD integer adder, operated by a single-instruction multiple data (SIMD) computing device having SIMD registers, corresponding elements of a first SIMD-sized integer (A) and a second SIMD-sized integer (B) to generate a SIMD-sized integer result (R) and a carry bit, wherein A has an integer size (SizeA), and B has an integer size (SizeB); and in response to SizeA greater than SizeB, updating R and the carry bit, by the SIMD integer adder, in view of one or more elements of A that do not have corresponding element or elements of B;

wherein element-wise SIMD adding includes performing one or more mathematical operations on first one or more masks, with the first one or more masks interpreted as integers, and interpreting one or more integer results of the one or more mathematical operations as second one or more masks;

wherein performing one or more mathematical operations on first one or more masks comprises performing one or more mathematical operations on a carry mask and a saturation mask, wherein the carry mask indicates whether overflow occurred in each SIMD element during the element-wise SIMD adding, and wherein the saturation mask indicates which element or elements of R has all 1 bits;

wherein performing one or more mathematical operations on a carry mask and a saturation mask comprises shifting left the carry mask by 1 bit to generate a first instance of a correction mask;

performing a bitwise Boolean OR operation on the first instance of the correction mask with a carry in to generate a second instance of the correction mask;

integer adding the saturation mask to the second instance of the correction mask to generate a third instance of the correction mask; and performing a bitwise Boolean XOR operation on the third instance of the correction mask with the saturation mask to generate a fourth instance of the correction mask.

2. The method of claim 1, wherein element-wise SIMD adding comprises element-wise SIMD adding of the corresponding elements of A and B with wrapping to generate the result R.

3. The method of claim 1, further comprising moving the first one or more masks from first one or more mask registers of the SIMD computing device respectively to one or more general purpose registers of the SIMD computing device, prior to performing the one or more mathematical operations on the first one or more masks; and moving the second one or more masks from the one or more general purpose registers respectively to second one or more mask registers of the SIMD computing device, after performing the one or more mathematical operations on the first one or more masks in the one or more general purpose registers.

4. The method of claim 1, wherein element-wise SIMD adding further comprises element-wise SIMD unsigned integer less compare of R to A to generate a carry mask that indicates whether overflow occurred in each SIMD element during the element-wise SIMD adding.

5. The method of claim 1, wherein element-wise SIMD adding further comprises element-wise SIMD unsigned integer equality compare of R to an all 1 binary constant to generate a first instance of a saturation mask that indicates which element or elements of a R has all 1 bits.

6. The method of claim 1, wherein the second one or more masks comprise a correction mask, and element-wise SIMD adding comprises element-wise SIMD integer subtracting of an initial result of the element-wise SIMD adding from an all 1 binary constant, masked by the correction mask, to generate R.

7. The method of claim 1, wherein the second one or more masks comprise a correction mask, and element-wise SIMD adding comprises right shifting the correction mask by an effective mark width in bits, to generate the carry bit.

8. The method of claim 1, wherein updating R and the carry bit comprises updating R and the carry bit in view of one or more elements of A that do not have corresponding element or elements of B, while the carry bit does not equal 0, and at least one element of A has not been considered.

9. The method of claim 8, wherein updating R and the carry bit in view of one or more elements of A that do not have corresponding element or elements of B, while the carry bit does not equal 0, and at least one element of A has not been considered comprises:
for an element of A that does not have corresponding element of B while the carry bit does not equal 0,
generating a saturation mask by performing element-wise compare less between a current result of the element-wise SIMD adding and an all 1 binary constant;
integer adding the saturation mask to a current value of the carry bit to generate a first instance of a correction mask; and
performing a bitwise Boolean XOR operation on the first instance of the correction mask with the saturation mask to generate a second instance of the correction mask.

10. The method of claim 8, updating R and the carry bit in view of one or more elements of A that do not have corresponding element or elements of B, while the carry bit does not equal 0, and at least one element of A has not been considered further comprises for an element of A that does not have corresponding element of B while the carry bit does not equal 0, right shifting the correction mask by an effective mark width in bits to update the carry bit.

11. The method of claim 8, wherein updating R and the carry bit further comprises updating R in view of one or more elements of A that do not have corresponding element or elements of B, after the carry bit has been determined to equal 0, and at least one element of A has not been considered.

12. An apparatus, comprising:
a single-instruction multiple data (SIMD) processor having SIMD registers, general purpose registers and mask registers; and
a SIMD integer adder configured to be operated by the SIMD processor to add two integers A and B with sizes SizeA and SizeB respectively;
wherein the SIMD integer adder is configured to:
element-wise SIMD add corresponding elements of a first SIMD-sized integer (A) and a second SIMD-sized integer (B) to generate a SIMD-sized integer result (R) and a carry bit, and
in response to SizeA greater than SizeB, update R and the carry bit, in view of one or more elements of A that do not have corresponding element or elements of B; and
wherein the SIMD integer adder is further configured to perform, as part the element-wise SIMD addition, movement of first one or more masks from first one or more of the mask registers respectively into one or more of the general purpose registers, performance of one or more mathematical operations on the first one or more masks in the one or more general purpose registers, and movement of one or more integer results of the one or more mathematical operations in the one or more general purpose registers to second one or more mask registers to store as second one or more masks;
wherein the SIMD integer adder is further configured to perform, as part of the performance of one or more mathematical operations on the first one or more masks, one or more mathematical operations on a carry mask and a saturation mask, including left shift of the carry mask by 1 bit to generate a first instance of a correction mask;
bitwise Boolean OR on the first instance of the correction mask with a carry in to generate a second instance of the correction mask;
integer addition of the saturation mask to the second instance of the correction mask to generate a third instance of the correction mask; and
bitwise Boolean XOR operation on the third instance of the correction mask with the saturation mask to generate a fourth instance of the correction mask;
wherein the carry mask indicates whether overflow occurred in each SIMD element during the element-wise SIMD adding, and wherein the saturation mask indicates which element or elements of R has all 1 bits.

13. The apparatus of claim 12, wherein the second one or more masks comprise a correction mask; and wherein the SIMD integer adder is further configured to perform, as part the element-wise SIMD addition, element-wise SIMD integer subtraction of an initial result of the element-wise SIMD addition from an all 1 binary constant, masked by the correction mask, to generate R, and performance of right shift of the correction mask by an effective mark width in bits, to generate the carry bit.

14. The apparatus of claim 12, wherein the SIMD integer adder is further configured to perform, as part the update of R and the carry bit,
update R and the carry bit in view of one or more elements of A that do not have corresponding element or elements of B, while the carry bit does not equal 0, and at least one element of A has not been considered; and
update R in view of one or more elements of A that do not have corresponding element or elements of B, after the carry bit has been determined to equal 0, and while at least one element of A has not been considered.

15. The apparatus of claim 14, wherein the SIMD integer adder is further configured to perform, as part of the update of R and the carry bit in view of one or more elements of A that do not have corresponding element or elements of B, while the carry bit does not equal 0, and at least one element of A has not been considered, for an element of A that does not have corresponding element of B while the carry bit do not equal 0,
generation of a saturation mask by performing element-wise compare less between a current result of the element-wise SIMD adding and an all 1 binary constant;
integer addition of the saturation mask to a carry in to generate a first instance of a correction mask; and
performance of a bitwise Boolean XOR operation on the first instance of the correction mask with the saturation mask to generate a second instance of the correction mask.

16. The apparatus of claim 15, wherein the SIMD integer adder is further configured to perform, as part of the update R and the carry bit in view of one or more elements of A that do not have corresponding element or elements of B, while the carry bit does not equal 0, and at least one element of A has not been considered,
for an element of A that does not have corresponding element of B while the carry bit do not equal 0,
performance of right shift of the correction mask by an effective mark width in bits to update the carry bit.

17. A computer-readable non-transitory storage medium, comprising
a plurality of programming instructions stored in the storage medium, and configured to cause a SIMD apparatus, in response to execution of the programming instructions, to perform SIMD integer addition operations including:
element-wise SIMD adding corresponding elements of a first SIMD-sized integer (A) and a second SIMD-sized integer (B) to generate a SIMD-sized integer result (R) and a carry bit, wherein A has an integer size (SizeA), and B has an integer size (SizeB); and
in response to SizeA greater than SizeB, updating R and the carry bit in view of one or more elements of A that do not have corresponding element or elements of B;
wherein element-wise SIMD adding includes performing one or more mathematical operations on a carry mask and a saturation mask, comprising
shifting left the carry mask by 1 bit to generate a first instance of a correction mask;
performing a bitwise Boolean OR operation on the first instance of the correction mask with a carry in to generate a second instance of the correction mask;
integer adding the saturation mask to the second instance of the correction mask to generate a third instance of the correction mask; and
performing a bitwise Boolean XOR operation on the third instance of the correction mask with the saturation mask to generate a fourth instance of the correction mask; and
wherein the carry mask indicates whether overflow occurred in each SIMD element during the element-wise SIMD adding, and wherein the saturation mask indicates which element or elements of R has all 1 bits.

* * * * *

UNITED STATES PATENT AND TRADEMARK OFFICE
CERTIFICATE OF CORRECTION

PATENT NO.        : 8,706,795 B2
APPLICATION NO.   : 13/391263
DATED             : April 22, 2014
INVENTOR(S)       : Sergey Lyalin Page 1 of 1

It is certified that error appears in the above-identified patent and that said Letters Patent is hereby corrected as shown below:

In the claims

Column 10
Line 11, "..., as part the..." should read - ..., as part of the...

Line 26, "...mask, including left shift of..." should read
-...mask, including
       left shift of...

Lines 44-45, "...,as part the..." should read - ..., as part of the ...

Line 52, "..., as part the..." should read - ..., as part of the ...

Column 11
Line 2, "...do not ..." should read - ... does not...

Line 20, "...do not..." should read - ...does not...

Signed and Sealed this
Nineteenth Day of July, 2016

Michelle K. Lee
*Director of the United States Patent and Trademark Office*